United States Patent
Zheng et al.

(10) Patent No.: US 10,125,816 B2
(45) Date of Patent: Nov. 13, 2018

(54) KIND OF SELF-ADJUSTING STATIC PRESSURED PLANE GUIDE RAIL

(71) Applicant: SUZHOU SUSHI TESTING INSTRUMENT CO., LTD., Suzhou (CN)

(72) Inventors: Jianzhou Zheng, Suzhou (CN); Qionghua Zhong, Suzhou (CN)

(73) Assignee: SUZHOU SUSHI TESTING INSTRUMENT CO., LTD., Suzhou (CN)

( * ) Notice: Subject to any disclaimer, the term of this patent is extended or adjusted under 35 U.S.C. 154(b) by 0 days.

(21) Appl. No.: 15/540,679

(22) PCT Filed: Mar. 23, 2015

(86) PCT No.: PCT/CN2015/074865
§ 371 (c)(1),
(2) Date: Jun. 29, 2017

(87) PCT Pub. No.: WO2016/106980
PCT Pub. Date: Jul. 7, 2016

(65) Prior Publication Data
US 2018/0003225 A1    Jan. 4, 2018

(30) Foreign Application Priority Data

Dec. 29, 2014   (CN) .................. 2014 1 08499516

(51) Int. Cl.
*F16C 32/06* (2006.01)
*G01M 7/02* (2006.01)
(Continued)

(52) U.S. Cl.
CPC .......... *F16C 32/0659* (2013.01); *B23Q 1/262* (2013.01); *F16C 27/045* (2013.01);
(Continued)

(58) Field of Classification Search
CPC .. F16C 27/045; F16C 29/025; F16C 32/0659; F16C 32/6677; F16C 32/0692;
(Continued)

(56) References Cited

U.S. PATENT DOCUMENTS 3,384,425 A  *  5/1968  Brown ................. F16C 29/025
                                                          384/12
3,658,393 A  *  4/1972  Luthi .................... B23Q 1/385
                                                          384/100

(Continued)

FOREIGN PATENT DOCUMENTS

GB          1054899 A  *  1/1967  ............ F16C 29/025
JP       2000120685 A  *  4/2000  ............. F16C 32/06

*Primary Examiner* — Marcus Charles
(74) *Attorney, Agent, or Firm* — Oliff PLC

(57) ABSTRACT

A self-adjusting static pressured plane guide rail consists of a base, slider provided on the base and an upper pressing plate corresponding to the shoulders on both sides of the slider; wherein: each upper pressing plate's outer edge contacts the base to form a fulcrum and the upper pressing plate's inner edge acts as the force portion and a upper pressing block is set between force portion and the slider's shoulder and a metal wire is set between the upper pressing block's top surface and the force portion's bottom surface of upper pressing plate along the slider's sliding direction; the upper pressing plate is provided with pre-tightening bolt to connect the base in a fixed way. When vibration frequency changes during operation, the oil film gap changes accordingly due to pre-tightening bolt's elasticity of the mutual function and the metal wire's elasticity to always maintain oil film layer's rigidity function.

3 Claims, 3 Drawing Sheets

(51) Int. Cl.
*F16C 29/02* (2006.01)
*F16C 27/04* (2006.01)
*B23Q 1/26* (2006.01)

(52) U.S. Cl.
CPC ........ *F16C 29/025* (2013.01); *F16C 32/0677* (2013.01); *G01M 7/02* (2013.01); *G01M 7/025* (2013.01)

(58) Field of Classification Search
CPC ..... F16C 2322/39; G01M 7/02; G01M 7/025; B23Q 1/28; B23Q 1/38; B23Q 1/262
USPC .................. 384/8, 12, 26, 121, 93, 105, 123
See application file for complete search history.

(56) References Cited

U.S. PATENT DOCUMENTS

| | | | | |
|---|---|---|---|---|
| 3,994,540 | A * | 11/1976 | Petersen | F16C 29/025 108/143 |
| 4,114,959 | A * | 9/1978 | Christ | F16C 32/0659 384/12 |
| 4,368,930 | A * | 1/1983 | Duchaine | F16C 32/0666 384/12 |
| 4,376,556 | A * | 3/1983 | Bergman | B23Q 1/262 384/44 |
| 4,915,510 | A * | 4/1990 | Arvidsson | F16C 23/02 384/121 |
| 5,273,364 | A * | 12/1993 | Hara | B23Q 1/58 384/45 |
| 8,556,509 | B2 * | 10/2013 | Sung | F16C 29/025 384/12 |

* cited by examiner

KIND OF SELF-ADJUSTING STATIC PRESSURED PLANE GUIDE RAIL

The present application is a national stage of PCT/CN2015/074865 filed Mar. 23, 2015, which claims priority to CN2014108499516 filed Dec. 29, 2014. The disclosure of the prior applications is hereby incorporated in its entirety herein.

TECHNICAL FIELD

The present invention is related to a static pressured plane guide rail for the test equipments in mechanical environment, especially related to a static pressured plane guide rail for guiding in the horizontal vibration test. The static pressured guide rail could realize the self-adjustment of plane gap.

BACKGROUND OF INVENTION

The purpose of the vibration test is to simulate the vibration load and its influence on the specimen during the transportation, storage and use of the product in the laboratory and to assess its adaptability. In the vibration test, the vast majority of tests are required to use the vibration table with the horizontal slip table for horizontal test, and the early horizontal vibration test applied the marble or granite as a bearing plane for the horizontal slip table, with hydraulic oil as a lubrication medium between the horizontal slip table and marble, while this type of structure of the bearing capacity is small and the anti-overturning ability is poor, so it's suitable for lighter load and small scale level test. But there are more and more large loads and high-scale level vibration tests, the early technical means has been far from new test technology requirements.

Nowadays, with the increasing requirements of the mechanical environment test and the continuous updating of the test conditions and methods, the technician uses the static pressured plane guide rail to support the horizontal slip table, and uses the large bearing capacity and high of the high anti-overturning moment of static pressured plane guide rail to realize the bearing and guiding for the high load and high level horizontal vibration test.

In the prior art, the structure of conventional static pressured plane guide rail is as shown in FIG. 1 and it includes a base 1, a slider 2 provided on the base 1 and an upper pressing plate 3 corresponding to the shoulders on both sides of the slider, a rigid oil film layer 4 formed between the upper surface of shoulder of slider 2 and upper pressing plate 3, and a rigid oil film layer 4 formed between the lower surface of slider 2 and base 1. The upper pressing plate 3 is fixed on the base 1 and the distance between the upper pressing plate 3 and base 1 is fixed, and the difference between the distance and the thickness of the shoulder of the slider 2 is the oil film mating gap, and the size of the oil film mating gap is reserved at the time of processing and fixed.

The disadvantages of the existing static pressured plane guide rail are:
1. The gap between the rigid oil film layer is fixed and the oil film is also vibrating during the vibration process, and the oil film will gradually reduce the rigidity with the increasing vibration frequency, that is, in this structure, due to the gradual increasing of vibration frequency, the bearing capacity of bearing is decreased and the oil film layer may lose its rigidity resulting in the dry friction of static pressured plane guide rail and damage to the equipment when it reaches a certain frequency;
2. The oil film layer of conventional static pressured plane guide rail is ensured by the mating gap, that is, the size of the gap must be consistent, which requires the high requirement on the processing of components of static pressured plane guide rail, and if the gap size has the height difference, it's prone to cause the quick pressure loss of rigid oil film of static pressured plane guide rail and failure to meet the rigidity requirement for the oil film layer, which will affect the overall performance of the equipment.

Thus, how to solve out the above-mentioned issue of the static pressured plane guide rail has been a subject by a person skilled in the art.

DISCLOSURE OF THE INVENTION

The purpose of present invention is to provide a self-adjusting static pressured plane guide rail to solve out the problem of gradual decreasing of oil film rigidity with the increasing vibration frequency during the vibration process of existing static pressured plane guide rail to ensure the bearing and guiding capability within the operating range of static pressured plane guide rail to the utmost extent.

To achieve above aim, the technical solution applied in this invention is: a self-adjusting static pressured plane guide rail consists of a base, a slider provided on the base and an upper pressing plate corresponding to the shoulders on both sides of the slider; the outer edge of each upper pressing plate contacts the base to form a fulcrum and the inner edge of upper pressing plate acts as the force portion and a upper pressing block is set between the force portion and the shoulder of slider and a metal wire is set between the top surface of the upper pressing block and the bottom surface of force portion of upper pressing plate along the sliding direction of slider; the upper pressing plate is provided with a pre-tightening bolt to connect the base in a fixed way and the pre-tightening bolt is located between the fulcrum and force portion of the upper pressing plate; the pressure oil is fed between the bottom surface of upper pressing block and top surface of slider shoulder to form the rigid oil film layer and the pressure oil is fed between the bottom surface of slider and base to form the rigid oil film layer.

In above described technical solution, the bottom surface of the force portion of the upper pressing plate is provided with a first positioning groove corresponding to the metal wire and the top surface of the upper pressing block is provided with a second positioning groove corresponding to the metal wire, and the total groove depth of first positioning groove and second positioning groove is smaller than the radial size of metal wire; the upper portion of metal wire is inserted in the first positioning groove and the lower portion is inserted in the second positioning groove.

In above described technical solution, the cross section of the metal wire is preferably round, and the metal wire may be actually rectangular, pentagonal, hexagonal, or the regular shape.

The design principle and effect of present invention is as follows:
The design of present invention makes the upper pressing plate equivalent to the supporting beam structure at two ends subjected to the concentrated load, and the concentrated load is equal to the torque of pre-tightening bolt. The outer edge of upper pressing plate is supported on the base, while the force portion in the inner edge is supported on the metal wire; the metal wire is equivalent to a spring model; and the pre-tightening bolt is also equivalent to the spring model. In the non-working state, the contact surface between the slider and base and between the slider and upper pressing block is direct without any gap; and during operation, the pressure oil is fed to the contact surface between the slider and base and between the slider and upper pressing block to form the rigid oil film layer, which can be equivalent to the spring model to generate the supporting force and generate the oil film gap. Due to the elastic function of pre-tightening bolt, the pre-tightening bolt is drawn by the force of rigid oil film to have the slight elastic deformation. When the vibration frequency changes, the oil film gap changes accordingly due to the mutual function of the elasticity of the pre-tightening bolt and the elasticity of the metal wire to always maintain the rigidity function of oil film layer, that is, to ensure the bearing and guiding capability of static pressured plane guide rail within the operating frequency range. In addition, the machining precision requirements of the components of the static pressured plane guide rail of the present invention are not high and the production is convenient.

In the above Figures: 1. Base; 2. Slider; 3. Upper pressing plate; 31. Fulcrum; 32. Force portion; 33. First positioning groove; 4. Rigid oil film layer; 5. Upper pressing block; 51. Second positioning groove; 6. Metal wire; 7. Pre-tightening bolt.

SPECIFIC EMBODIMENT

With reference to the accompanying drawings and embodiment, the present invention will be described in detail.
Embodiment: Refer to FIG. 2-5:
A self-adjusting static pressured plane guide rail consists of a base 1, a slider 2 provided on the base 1 and an upper pressing plate 3 corresponding to the shoulders on both sides of the slider 2.

Figure 1:
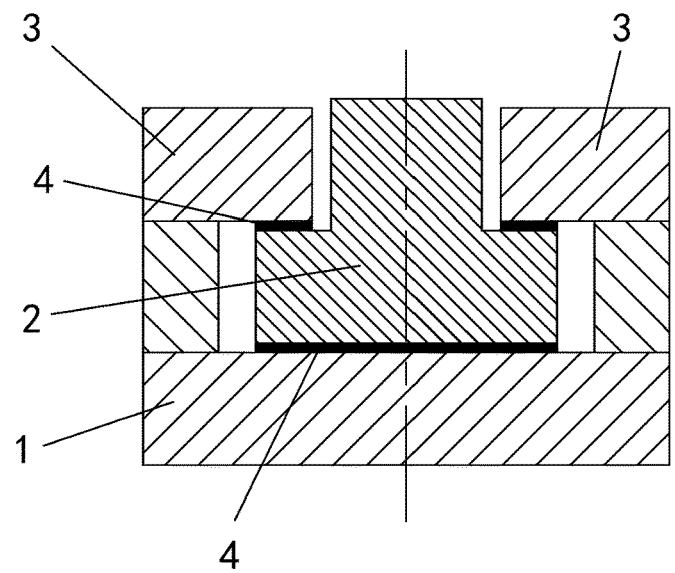
FIG. 1 is a schematic cross-sectional view of a prior art structure in a direction perpendicular to the sliding direction of the slider.
Figure 2:
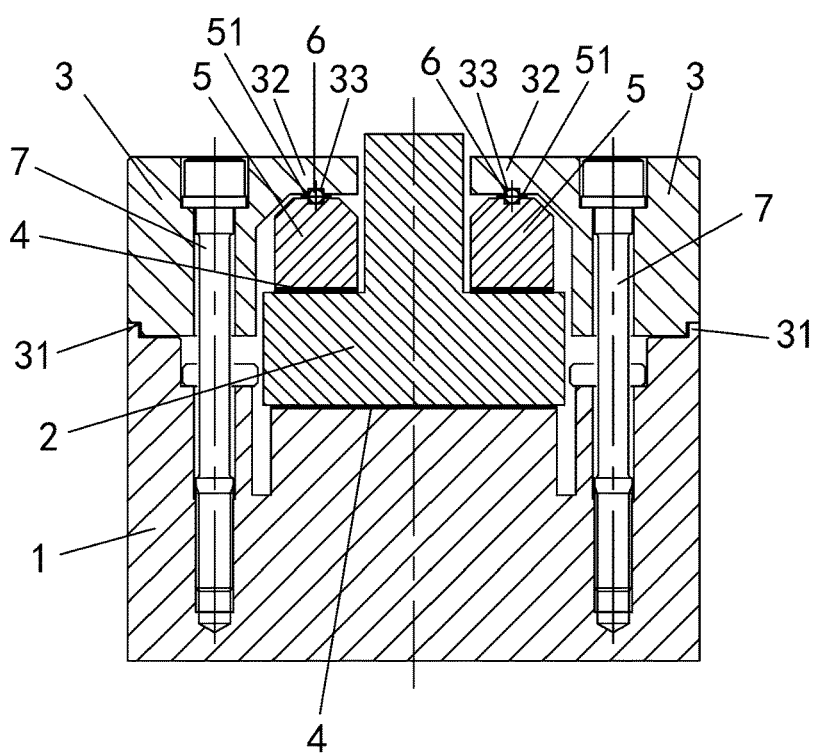
FIG. 2 is a schematic cross-sectional view of a embodiment of present invention in a direction perpendicular to the sliding direction of the slider.
Figure 3:
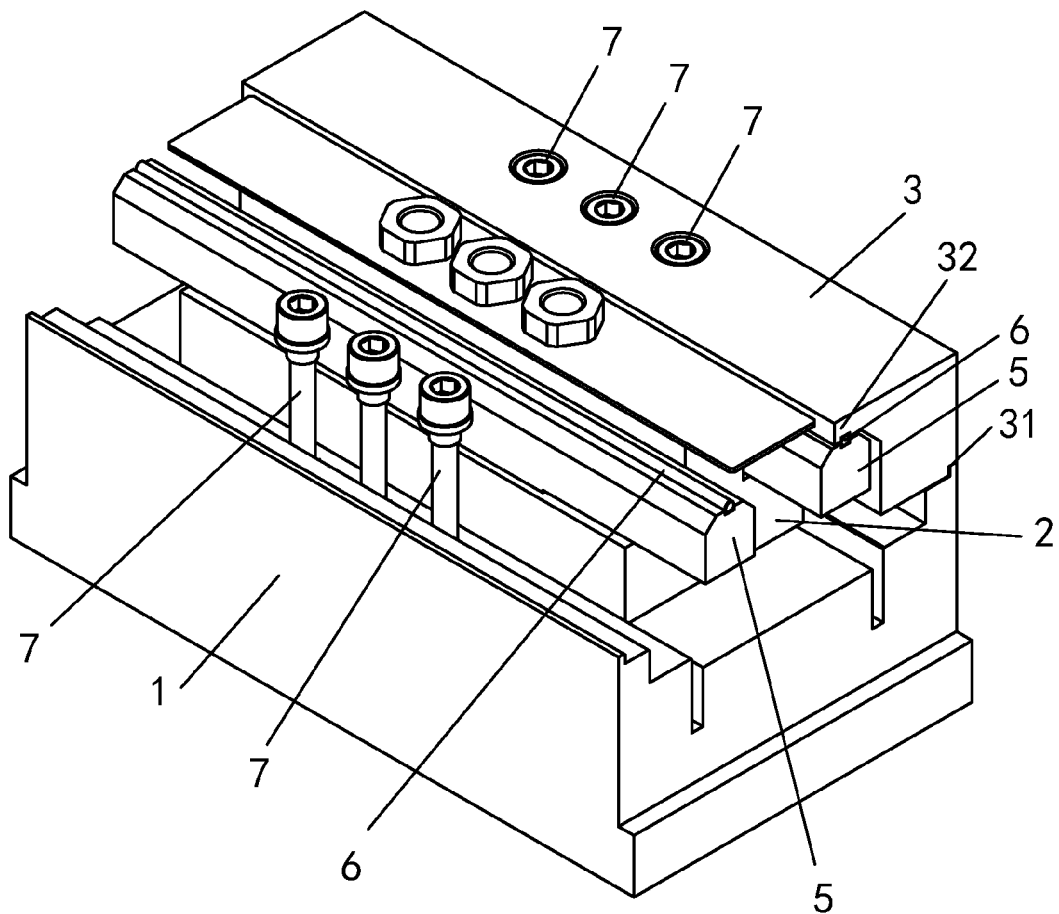
FIG. 3 is the perspective schematic view of embodiment of present invention and one upper pressing plate is concealed in the Figure.

As shown in FIGS. 2 and 3, the outer edge of each upper pressing plate 3 contacts the base 1 to form a fulcrum 31 and the inner edge of upper pressing plate acts as the force portion 32. A upper pressing block 5 is set between the force portion 32 and the shoulder of slider 2 and a metal wire 6 is set between the top surface of the upper pressing block 5 and the bottom surface of force portion 32 of upper pressing plate 3 along the sliding direction of slider 2.

As shown in FIGS. 2 and 3, the upper pressing plate 3 is provided with several pre-tightening bolts 7 (as shown in the figure, each upper pressing plate 3 is set with three pre-tightening bolts 7 and the actual quantity is not defined) to connect the base 1 in a fixed way and the pre-tightening bolt 7 is located between the fulcrum 31 and force portion 32 of the upper pressing plate 3. During operation, the pressure oil is fed between the bottom surface of upper pressing block 5 and top surface of slider 2 shoulder to form the rigid oil film layer 4 and the pressure oil is fed between the bottom surface of slider 2 and base 1 to form the rigid oil film layer 4.

Figure 4:
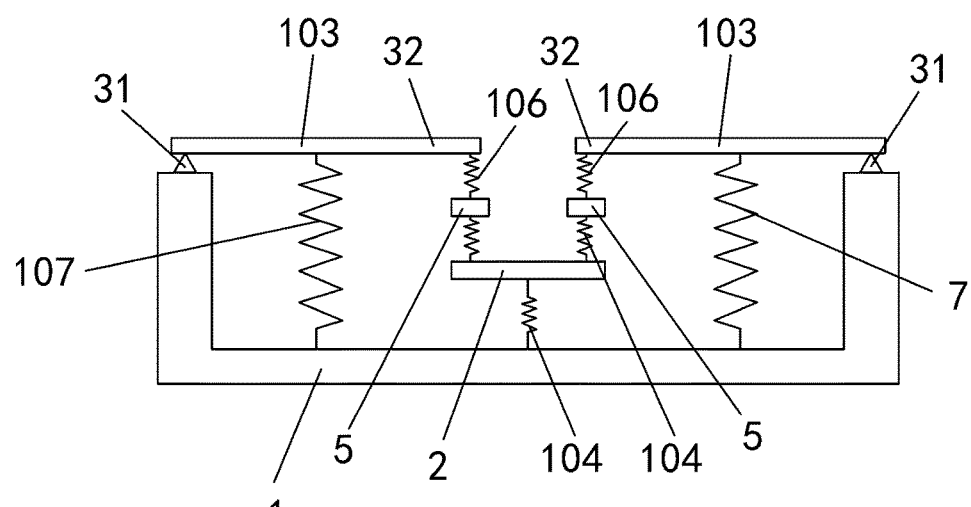
FIG. 4 is a simplified schematic cross-sectional view of a embodiment of present invention in a direction perpendicular to the sliding direction of the slider.
Figure 5:
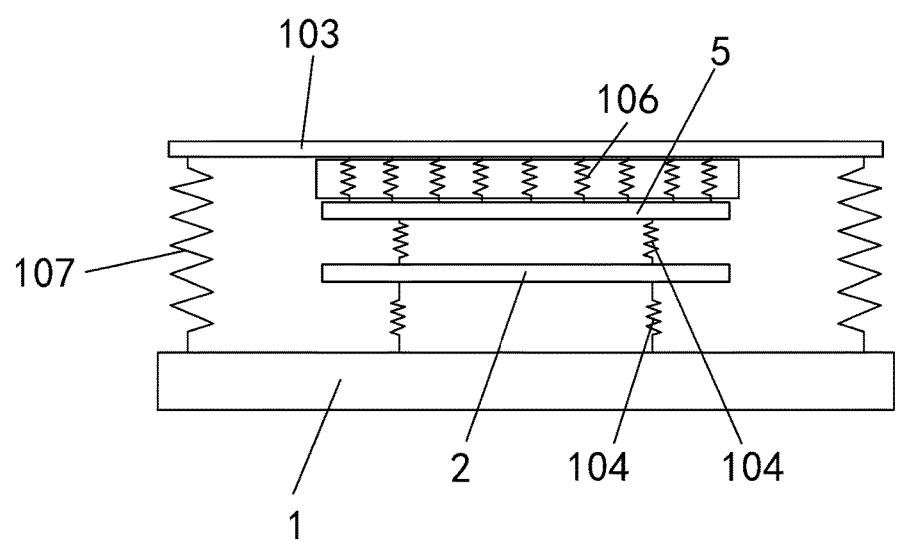
FIG. 5 is a simplified schematic cross-sectional view of a embodiment of present invention in a direction along the sliding direction of the slider.

For this embodiment, the structure could be simplified to equivalent to the structure in FIGS. 4 and 5, the upper pressing plate 3 is equivalent to the supporting beam structure 103 at two ends subjected to the concentrated load, and the concentrated load is equal to the torque of pre-tightening bolt 7. The outer edge of upper pressing plate 3 is supported on the base 1, while the force portion in the inner edge is supported on the metal wire 6; the metal wire 6 is equivalent to a spring model 106; and the pre-tightening bolt 7 is also equivalent to a spring model 107; in the non-working state, the contact surface between the slider 2 and base 1 and between the slider 2 and upper pressing block 5 is direct without any gap; and during operation, the pressure oil is fed to the contact surface between the slider 2 and base 1 and between the slider 2 and upper pressing block 5 to form the rigid oil film layer 4, which 4 can be equivalent to a spring model 104 to generate the supporting force and generate the oil film gap. Due to the elastic function of pre-tightening bolt 7, the pre-tightening bolt 7 is drawn by the force of rigid oil film to have the slight elastic deformation. When the vibration frequency changes, the oil film gap changes accordingly due to the mutual function of the elasticity of the pre-tightening bolt 7 and the elasticity of the metal wire 6 to always maintain the rigidity function of oil film layer, that is, to ensure the bearing and guiding capability of static pressured plane guide rail within the operating frequency range.

The function of the metal wire 6 in the present invention is to ensure the uniformity of the gap of the rigid oil film layer 4, since the metal wire 6 itself is similar to the spring structure and it could be equivalent to the numerous spring models between the upper pressing plate 3 and upper pressing block 5 as shown in FIG. 5. When the oil film gap is nonuniform due to manufacturing, assembly or use, the uniformity of the oil film gap can be always maintained in combination with the elasticity function of the pre-tightening bolts 7.

The torque required to tighten the pre-tightening bolt 7 during assembly can be calculated from the required oil film gap, oil film rigidity, the force produced by the oil film, and the mechanical properties of the relevant parts.

About the positioning of the metal wire 6, the following solution is preferable: the bottom surface of the force portion 32 of the upper pressing plate 3 is provided with a first positioning groove 33 corresponding to the metal wire 6 and the top surface of the upper pressing block 5 is provided with a second positioning groove 51 corresponding to the metal wire 6, and the total groove depth of first positioning groove 33 and second positioning groove 51 is smaller than the radial size of metal wire 6; the upper portion of metal wire 6 is inserted in the first positioning groove 33 and the lower portion is inserted in the second positioning groove 51. In practice, it is also feasible that one of the first positioning groove 33 and the second positioning groove 51 is provided.

The metal wire 6 is preferably made of round cross-section steel wire, and the actual use of other regular sections of the metal wire could also achieve a certain effect.

It should be noted that the above described embodiments are only for illustration of technical concept and characteristics of present invention with purpose of making those skilled in the art understand the present invention, and thus these embodiments shall not limit the protection range of present invention. The equivalent changes or modifications according to spiritual essence of present invention shall fall in the protection scope of present invention.

The invention claimed is:

1. A self-adjusting static pressured plane guide rail consists of a base, a slider provided on the base and an upper pressing plate corresponding to shoulders on both sides of the slider; wherein: an outer edge of each upper pressing plate contacts the base to form a fulcrum and an inner edge of upper pressing plate acts as a force portion, an upper pressing block is set between the force portion and the shoulder of the slider, a metal wire is set between a top surface of the upper pressing block and a bottom surface of the force portion of upper pressing plate along a sliding direction of the slider; the upper pressing plate is provided with a pre-tightening bolt to connect the base in a fixed way, the pre-tightening bolt is located between the fulcrum and the force portion of the upper pressing plate; pressure oil is fed between the bottom surface of the upper pressing block and a top surface of slider shoulder to form a rigid oil film layer, the pressure oil is fed between the bottom surface of the slider and the base to form a rigid oil film layer.

2. Said self-adjusting static pressured plane guide rail of claim 1 wherein: the bottom surface of the force portion of the upper pressing plate is provided with a first positioning groove corresponding to the metal wire, the top surface of the upper pressing block is provided with a second positioning groove corresponding to the metal wire, and the total groove depth of the first positioning groove and the second positioning groove is smaller than a radial size of the metal wire; an upper portion of the metal wire is inserted in the first positioning groove and a lower portion is inserted in the second positioning groove.

3. Said self-adjusting static pressured plane guide rail of claim 1 wherein: the cross section of the metal wire is round.

* * * * *